United States Patent [19]

Falk

[11] 4,212,958

[45] Jul. 15, 1980

[54] GRAFT POLYBLEND FLOW IMPROVERS FOR PVC

[75] Inventor: John C. Falk, Chicago, Ill.

[73] Assignee: Borg-Warner Corporation, Chicago, Ill.

[21] Appl. No.: 932,585

[22] Filed: Aug. 10, 1978

Related U.S. Application Data

[63] Continuation of Ser. No. 690,112, May 26, 1976, abandoned.

[51] Int. Cl.² ............................................. C08L 23/00
[52] U.S. Cl. ................................. 525/310; 525/309; 525/316; 525/322; 525/324
[58] Field of Search ........................ 260/876 R, 878; 525/309, 310, 316, 322, 324

[56] References Cited

U.S. PATENT DOCUMENTS

| | | | |
|---|---|---|---|
| 2,731,439 | 1/1956 | Jones et al. | 260/45.5 |
| 3,435,096 | 3/1969 | Limbert et al. | 260/878 R |
| 3,595,942 | 7/1971 | Wald et al. | 260/880 B |
| 3,642,950 | 2/1972 | O'Shea | 260/878 R |
| 3,849,518 | 11/1974 | Severini et al. | 525/322 X |
| 3,886,232 | 5/1975 | Tanaka et al. | 260/876 R |
| 3,959,895 | 6/1976 | Lonning | 260/876 R X |

*Primary Examiner*—Richard B. Turer
*Attorney, Agent, or Firm*—Richard J. Schlott

[57] ABSTRACT

Graft polyblends prepared by polymerizing acrylate ester monomers or mixtures of acrylate ester monomers and vinyl aromatic monomers in the presence of a rubbery saturated hydrocarbon polymer substrate are useful as modifiers for PVC, imparting improved flow and impact properties to PVC formulations when employed at low levels. The rubbery saturated hydrocarbon substrates useful for these purposes include mono-olefin polymers such as polyisobutylene, rubbery copolymers such as EPR, and rubbery hydrogenated polymers and copolymers of conjugated dienes.

3 Claims, No Drawings

GRAFT POLYBLEND FLOW IMPROVERS FOR PVC

This is a continuation of application Ser. No. 690,112 filed May 26, 1976 and now abandoned.

BACKGROUND OF THE INVENTION

This invention relates to polymeric flow and impact modifiers for PVC resin, and to PVC compositions. More particularly, the invention relates to graft polyblends prepared by polymerizing acrylate ester monomers or mixtures of acrylate ester monomers and vinyl aromatic monomers in the presence of a rubbery, saturated hydrocarbon polymer substrate, which are useful as modifiers for PVC to impart improved flow and impact properties thereto, and to PVC compositions having improved flow properties.

Polyvinyl chloride (PVC) resins are commonly fabricated from powders or pellets by thermal processes including extrusion and injection molding, during which the particles must be fused into a molten mass. In conventional processing, the fusion and subsequent processing is aided by incorporation of plasticizers. These plasticizers also improve the flow and shear characteristics of the PVC resins by reducing the melt viscosity, thus enhancing the overall processability. Plasticizers, however, are not entirely satisfactory for many purposes inasmuch as they materially reduce the rigidity and heat distortion temperature of the resin when employed in amounts sufficient to improve processability.

A further method for improving processability has been to employ a blend of PVC with a second polymeric resin together with a monomeric plasticizer to compatibilize the blend. The second polymeric resin, for example, may be a block copolymer having both rigid and rubbery segments, such as those disclosed in U.S. Pat. No. 3,801,529. The presence of large amounts of plasticizer in these compositions again reduces rigidity and the heat distortion temperature of the resin. It is desirable, therefore, to provide a processing aid which can be blended with a PVC resin to improve processability of the resin without materially reducing the heat distortion temperature of the product composition.

SUMMARY OF THE INVENTION

It has now been found that particular graft polyblend compositions, when blended with PVC resins, impart a major improvement in flow properties and thus facilitate processing without a marked reduction of heat distortion temperatures. More particularly, graft polyblends prepared by polymerizing an acrylate ester, optionally together with a vinyl aromatic monomer, in the presence of a rubbery saturated hydrocarbon polymer substrate such as, for example, rubbery polymers or copolymers of mono-olefins, hydrogenated 1,2-polybutadiene or copolymers thereof, and the like, impart excellent flow properties and impact properties to PVC resins without the requirement for monomeric plasticizers, thus resulting in processable compositions which retain the heat distortion characteristics of unmodified PVC.

DETAILED DESCRIPTION

The graft polyblend compositions of this invention are prepared by copolymerizing a vinyl aromatic monomer and/or an acrylate ester monomer in the presence of a rubbery, saturated hydrocarbon polymer substrate.

The rubbery saturated hydrocarbon polymers useful as substrates for the purposes of this invention include the rubbery polymers and copolymers of two-to-six carbon atom mono-olefins such as the copolymers of ethylene and propylene known as EPR rubbers, copolymers of ethylene and 1-butene, and the polymers of isobutylene as well as the rubbery hydrogenated homopolymers and copolymers of conjugated dienes, such as hydrogenated 1,3-butadiene polymers having greater than 40% of the butadiene monomer units in the form of 1,2-polymerized units and the hydrogenated polymers of isoprene. Rubbery copolymers including both random and block copolymers of butadiene containing 1,2-polymerized butadiene units together with up to 60% of a second vinyl monomer such as styrene, vinyl toluene and the like, when hydrogenated to remove the ethylenic unsaturation, are also useful as substrates.

Hydrogenation of the conjugated diene polymers may be carried out by a variety of well-established processes, including hydrogenation in the presence of such catalysts as Raney Nickel, noble metals such as platinum, palladium and the like or the "soluble" transition metal catalysts. The preferred process is one wherein the polymer is dissolved in an inert hydrocarbon diluent such as cyclohexane and hydrogenated by reaction with hydrogen in the presence of a soluble hydrogenation catalyst. These and similar low pressure hydrogenation processes are rapidly and conveniently carried out to give virtually complete removal of aliphatic unsaturation from the diene-derived portion of polymeric substrates. In the practice of the instant invention, the hydrogenation is preferably carried out until little or no aliphatic unsaturation remains insofar as can be detected by ordinary infrared spectroscopic techniques. The technique employed for the preparative examples suffices for detecting levels of unsaturation greater than about 0.1%–0.2% by weight, corresponding to one C=C group in 1,000 to 2,000 carbon atoms.

The polyblends are made by polymerizing an acrylic ester monomer optionally together with a vinyl aromatic monomer, in the presence of the rubbery substrate. Vinyl aromatic monomers useful for these purposes include styrene, substituted styrenes such as alpha-methyl styrene, the halostyrenes such as p-chlorostyrene, and the alkyl vinyl benzenes such as vinyl toluene and vinyl ethyl benzene. The acrylic ester monomers include acrylic and methacrylic esters of $C_1$-$C_{11}$ alcohols, exemplified by methyl methacrylate, ethyl acrylate and the like.

The composition of the graft polyblends may be varied, however, in order to be useful as a processing aid in blends with PVC, the graft polyblends will comprise from 50 to 90% by weight of rubbery substrate, and correspondingly from 50 to 10% rigid or graft phase. The graft phase will consist of from 0 to 70% by weight vinyl aromatic grafting monomer, preferably styrene, and from 100 to 30% by weight acrylate monomer, preferably methyl methacrylate. It is necessary that the content of rubbery substrate be greater than about 50% to maintain improvement in impact properties of the final PVC blend, while selection of the particular proportion of vinyl aromatic monomer and acrylic ester monomer within the given ranges will be based upon the type of rubbery substrate employed and upon the particular end use envisioned for the PVC blend composition.

The polyblends of this invention are particularly compatable with PVC, and their inclusion in PVC formulations is not detrimental to other physical properties including tensile properties. Further, the refractive index of these polyblends will depend upon the relative proportions of rubber, acrylic monomer and vinyl aromatic monomer in both the substrate and superstrate. Polyblend modifiers may thus be prepared with refractive indicies matching that of PVC and employed to provide transparent PVC formulations where desired for particular end-uses.

Conventional free-radical graft polymerization methods may be employed for preparation of these polyblend modifiers, including solution, suspension and emulsion processes. The preferred process is one whereby the rubbery substrate is converted to a crosslinked latex, and the polymerization of the grafting monomers is then carried out in the presence of this latex utilizing an oil-soluble free-radical initiator.

EXAMPLE 1—PREPARATION AND HYDROGENATION OF 1,2-POLYBUTADIENE

A sealed beverage bottle was charged with 700 ml. of cyclohexane, degassed, then pressurized with dry nitrogen. A hypodermic syringe needle was inserted through the seal, and 30.0 grams (0.56 moles) of butadiene-1,3-monomer, followed by 0.33 m. moles of N,N,N',N'-tetramethylethylene diamine and 0.3 m. moles of sec-butyl lithium (0.1 M. in cyclohexane). The bottle was then placed in a water bath at 50° C. and maintained for 16 hours. An aliquot of the mixture was removed after quenching with isopropanol, from which it was determined that the polybutadiene had $\eta = 1.63$ (toluene, 25° C.) and a microstructure corresponding to 69% content of 1,2-polymerized units.

Hydrogenation of the polybutadiene was carried out on the above polymer solution after diluting with dry cyclohexane to a concentration of 20 g/liter of solution.

A two-liter stirred reactor was charged with 1500 ml. of the above cyclohexane solution of 1,2-polybutadiene, together with 0.3 mole percent (based on double bonds) of a "soluble cobalt" catalyst.

"Soluble cobalt" catalysts may be prepared by adding 14.1 g. of a cobalt (II) octoate solution containing 12.0 weight percent cobalt over a period of 90 minutes to 287 ml. of a cyclohexane solution containing 0.0854 moles of s-butyl lithium. The product is a 0.091 m. solution of "soluble cobalt" catalyst having a Li/Co molar ratio of 3.0/1. An alternative preparation of "soluble cobalt" catalysts involves the addition of 23.6 g. of cobalt (II) octoate solution over a period of 90 minutes to a solution of 18.8 g. of triethyl aluminum in 494.6 g. of cyclohexane. The product is a 0.081 M solution of soluble cobalt catalyst having a 3.0/1 Al/Co molar ratio.

The hydrogenation reaction was maintained at 50° C. and hydrogen gas was bubbled into the reactor at 50 psi until no detectable unsaturation remained as determined for an aliquot sample by infrared analysis. The mixture was then removed from the reactor, extracted with dilute aqueous acid to remove catalyst residues, coagulated by pouring into isopropanol, collected and dried at 40° C. in a vacuum oven.

EXAMPLE 2—PREPARATION OF POLYBLENDS BY SOLUTION—PRECIPITATION POLYMERIZATION

A solution of hydrogenated 1,2-polybutadiene, prepared by dissolving 50 g. of hydrogenated 1,2-polybutadiene obtained as in Example 1 in 500 ml. of 1:1 (w/w) benzene-hexane solvent mixture, were charged to a resin kettle, together with 25 g. of styrene monomer, 25 g. of methyl methacrylate monomer and 2.0 g. of benzoyl peroxide. The resin kettle was placed in a thermostated water bath heated to 72° C. and the mixture was stirred for 20 hours. The product is observed to precipitate during polymerization in this solvent mixture, giving a swollen polymer/solvent mixture. The mixture was coagulated in isopropanol and the solid, when collected by filtration, dried at 60° C. under vacuum and weighed, amounted to 100 g.

EXAMPLE 3—PREPARATION OF POLYBLENDS BY LATEX POLYMERIZATION

A solution of 80 g. of hydrogenated 1,2-polybutadiene in 800 ml. of cyclohexane prepared as in Example 1 was added to 800 ml. of water containing 1.6 g. of benzoyl peroxide and a surfactant and stirred using a Premier Mill Dispersator device. The resulting mixture was then passed immediately through a homogenizer to produce a latex.

The resulting latex was heated 20 hours at 72° C. to effect substrate crosslinking. Solvent was removed by distillation to give a solvent-free aqueous latex. Coagulation during this step amounted to less than ½%. Any coagulum present was removed by filtration through cheese cloth.

A mixture containing 10 g. of styrene monomer, 10 g. of methyl metacrylate and 2.0 g. of benzoyl peroxide was added to the latex. The reaction mixture was stirred at 72° C. for 20 hours, and poured into isopropanol to effect product coagulation. The solid, collected, dried at 60° C. in a vacuum oven, and weighed, amounted to 100 g.

EXAMPLE 4—GRAFT POLYBLEND WITH A COPOLYMER RUBBER SUBSTRATE

A styrene 1,2-polybutadiene rubber was prepared by anionic polymerization of a mixture of 50 parts styrene and 50 parts 1,3-butadiene substantially as shown in U.S. Pat. No. 3,598,886, Example 1. The rubbery product was hydrogenated by the method of Example 1 to provide a hydrogenated rubber having no detectable unsaturation.

A solution of 80 g. of hydrogenated styrene-high-vinyl butadiene rubber in 800 ml. of cyclohexane was added to 800 ml. of water containing 1.6 g. of benzoyl peroxide, converted to a latex and crosslinked by heating at 72° C. as in Example 3. A mixture containing 10 g. of styrene monomer, 10 g. of methyl methacrylate and 2.0 g. of benzoyl peroxide was added to the latex, the mixture was stirred at 72° C. for 20 hours and then poured into isopropanol to effect coagulation. The solid, collected, dried at 60° C. in a vacuum oven, and weighed, amounted to 100 g.

The PVC resin employed may be any of the conventional extrusion and injection molding PVC resins, including vinyl chloride polymers and copolymers wherein the major component of the resin is vinyl chloride. The blends of PVC with the processing aids of this invention will comprise from about 3 to about 25 parts by weight of graft polyblend flow improver per 100 parts by weight of PVC. The blends may be further compounded to include stabilizers, pigments, lubricants and the like.

The following examples illustrate the preparation of blends typical of this invention. All blends shown were prepared by a standard procedure in which the following masterbatch formulation, in combination with the indicated amount of graft polyblend, was mill-mixed at 360° F. for 10 minutes, then a portion was compression molded at 450° F. for 4 to 10 minutes to provide test specimens.

EXAMPLE 5—PVC MASTERBATCH FORMULATION

| Material | Tradename and Source | Parts by Weight |
|---|---|---|
| PVC | Geon 93, B. F. Goodrich Chemical Co. | 100 |
| Processing Aid | Acrylic K120N, Rohm and Haas. Co. | 2.0 |
| Tin Stabilizer | Mark 1414A, Argus Chemical Corp. | 2.0 |
| Lubricant | Hoechst Wax E, Farbwerke Hoechst, AG | 0.4 |
| Lubricant | Aldo MS, Glyco Chemicals, Inc. | 0.9 |
| Toner | | 0.075 |

The graft polyblends used as modifiers were prepared in accordance with Examples 2-4, using the amount of styrene and/or methyl methacrylate and the particular substrates shown in the tables below.

TABLE I.

| Example No. | Modifier[1] Type | Parts | HDT[2] °C. | $\eta_a$[3] 200$\gamma$ | $10^3\gamma$ |
|---|---|---|---|---|---|
| 5 | None | 0 | 69 | 0.35 | 0.0094 |
| 6 | 20(S/MMA) 80 PBd-R | 5.8 | 68 | 0.14 | 0.050 |
| 7 | 50(S/MMA) 50 PBd-R | 5.8 | 70 | 0.13 | 0.054 |
| 8 | 20(S/MMA) 80 (50SBd-R) | 5.8 | 69 | 0.25 | 0.017 |
| 9 | Diphenyl phthalate | 5.8 | 58 | 0.19 | 0.058 |
| 10 | Dicyclohexyl phthalate | 5.8 | 58 | 0.20 | 0.064 |

Notes:
[1]20(s/MMA)80PBd-R = 20 parts styrene/methyl Methacrylate (1:1) polymerized in presence of 80 parts hydrogenated 1,2-polybutadiene. See Example 3.
20 (S/MMA) 80(50SBd-R) = 20 parts (S/MMA) (1:1) polymerized in presence of 80 parts hydrogenated 50% styrene-50% 1,2-butadiene copolymer. See Example 4. Wt. % of total composition using masterbatch of Example 5. Parts = Parts polyblend per 100 parts PVC
[2]HDT - 264 psi heat distortion temperature, 10 mil deflection.
[3]$\eta_a$ = apparent viscosity at low shear (200$\gamma$) and high shear ($10^3\gamma$), Monsanto automatic Capillary Rheometer, 375° F., L/D 20 Cap. No. 201.

It will be seen from the viscosity data in TABLE I that the modifiers of this invention produce marked lowering of apparent melt viscosity. In Example 5, the PVC master-batch without modifier has a high shear apparent viscosity nearly twice as great as those of the modified blends, Examples 6-8. The two low-molecular weight commercial flow modifiers shown in Examples 9 and 10 also effect a decrease in melt viscosity. However, the heat distortion temperature is depressed more than 10° C. for the commercial compositions of Examples 9 and 10, while the modifiers of the instant invention, in Examples 6-8 do not significantly affect heat distortion temperature as compared with the unmodified masterbatch, Example 5.

Table II

| Example No. | Modifier[1] Type | Parts | Izod[2] Impact | Melt[3] Flow |
|---|---|---|---|---|
| 5 | None | 0 | 0.4 | 8.7 |
| 11 | 15(S/MMA) 80 PBd-R | 19.4 | 0.4 | Too fast |
| 12 | 20(S/MMA) 85 PBd-R | 19.4 | 0.7 | 516 |
| 13 | 35(S/MMA) 65 PBd-R | 19.4 | 1.2 | 516 |
| 14 | 50 (S/MMA) 50 PBd-R | 19.4 | 1.5 | Too fast |
| 15 | 20 MMA 80 PBd-R | 19.4 | 14.1 | 207 |

Notes:
[1]See Note 1., TABLE I.
[2]Notched Izod Impact, 23° C., ft lb/in notch.
[3]Melt Flow, cc/10 min., Monsanto Capillary Rheometer, L/D = 20/1, 140 psi, 375° F. Too fast = flow rate too fast to measure.

The marked improvement of melt flow properties in PVC compositions is again demonstrated at the 19.4 phr level as shown in TABLE II, where melt flow is given in cc/10 min. The modifiers of this invention clearly effect a many-fold increase in melt flow as compared with that of the unmodified masterbatch of Example 5.

Improvement in impact properties does not appear to be a function of rubber alone, in that the high rubber content of the modifier in Examples 11 and 12 produce little or no impact modification, while the comparable high-rubber, styrene-free modifier of Example 15 gave a markedly-enhanced Izod impact. That other factors are involved in impact improvement is further demonstrated by the data shown in TABLE III.

TABLE III

| Example No. | Modifier[1] Type | Parts | Izod[2] Impact |
|---|---|---|---|
| 16 | 20 (S/MMA) 80 PBd-R (Low Peroxide) | 19.4 | 2.9 |
| 17 | 5 (S/MMA) 95 (52SBd-R) | 19.4 | 5.1 |
| 18 | 20 (S/MMA) 80 (52 SBd-R) | 19.4 | 12.7 |

Notes:
[1]See Note 1. of TABLE I.
[2]See Note 2 of TABLE II.

The impact improvement with Example 16 was considerably greater than with Example 12. The major difference in the modifier being that only 0.5 wt. % of peroxide was used in the preparation of the modifier of Example 16, while in all other examples 1.0 wt. % peroxide was employed to prepare the modifier. Examples 17 and 18, using a hydrogenated high styrene (52%) rubber as the substrate, also gave much better impacts than resulted with most of the modifiers based on hydrogenated high vinyl polybutadiene substrates. Thus it will be apparent that optimization of a particular modifier composition will be necessary where both high impact and high melt flow properties are sought.

In the following Examples a masterbatch was again formulated employing Geon 103 EP as the PVC. The following masterbatch formulation, together with 5 parts of the indicated graft polyblend, was mill-mixed at 360° F. for 10 minutes, then compression molded at 450° for 4 to 10 minutes.

EXAMPLE 19—PVC MASTERBATCH FORMULATION

| Material | Tradename | Parts by Weight |
|---|---|---|
| PVC | Geon 103 EP | 100 |
| Processing Aid | Acryloid K-120N | 3.0 |
| Tin Stabilizer | Mark 1414A | 3.0 |
| Lubricant | Hoechst Wax E | 0.5 |
| Lubricant | Hoechst Wax PA-190 | 0.15 |

TABLE IV

| Example No. | 19 (Control) | 20 | 21 | 22 |
|---|---|---|---|---|
| Modifier[1] | None | 20 S/MMA 80 PBd-R | 20 (S/MMA) 80(52 SBd-R) | 35 (S/MMA) 65 (52 SBd-R) |
| HDT, °F[2] | 177 | 182 | 183 | 183 |
| Izod Impact[3] | 0.89 | 1.7 | 1.4 | 0.94 |
| Transmission[4] % | 84.4 | 34.7 | 82.1 | 72.8 |
| Haze[4] % | 10.3 | 97.7 | 14.6 | 33.1 |
| Tensile Str. psi | 7900 | 6600 | 6650 | 6900 |
| E % | >100 | >100 | 85 | 45 |
| Tensile Mod. psi | $4.3 \times 10^5$ | $3.8 \times 10^5$ | $3.7 \times 10^5$ | $3.8 \times 10^5$ |
| Melt Viscosity[5] | | | | |
| at 30 sec$^{-1}$ | $13.0 \times 10^5$ | $5.0 \times 10^5$ | $10.8 \times 10^5$ | $9.4 \times 10^5$ |
| at 200 sec$^{-1}$ | $3.20 \times 10^5$ | $1.59 \times 10^5$ | $2.60 \times 10^5$ | $2.85 \times 10^5$ |
| at 1000 sec$^{-1}$ | $0.74 \times 10^5$ | $0.54 \times 10^5$ | $0.64 \times 10^5$ | $0.79 \times 10^5$ |

Notes:
[1]See Table I, note 1.
[2]See Table I, note 2.
[3]See Table II, note 2.
[4]Transmission and Haze for 70 mil molded plaques.
[5]Melt Viscosity by Sieglaff-McKelvey Capillary Melt Rheometer at 390° F., r = 0.4949 cm.

It is again apparent from these data that the melt flow properties of PVC are markedly altered by incorporating small amounts of the modifiers of this invention. Both clear (Example 21) and translucent (Example 20) PVC compositions may be prepared by selection of modifiers with the appropriate refractive indicies, and the compatability of these modifiers with PVC will be seen to provide good retention of tensile properties.

EXAMPLE 23

A graft polyblend was prepared according to the process of Example 3, but using as the rubbery substrate 80 parts of a hydrogenated styrene-diene-styrene block copolymer, obtained from Shell Chemical Co. as Kraton G. The product, a 20 S/MMA 80 Kraton G graft polyblend (5 parts) was added to the PVC masterbatch formulation of Example 19 and the composition was milled and molded as before. This blend had an Izod impact of 1.2 ft. lbs/in. notch and an HDT of 180° F. The Melt Viscosity, measured by capillary rheometer as described for the Examples in Table IV was $10.9 \times 10^5$ at 30 sec$^{-1}$, $2.99 \times 10^5$ at 200 sec$^{-1}$, and 0.73 at 1000 sec$^{-1}$, again demonstrating that significant improvement in melt flow properties is imparted to PVC compositions by the polyblends of this invention.

EXAMPLE 24

A graft polyblend was prepared by the process of Example 3, but employing as the rubbery substrate 80 grams of an ethylene-propylene copolymer rubber (EPR), obtained as EPCAR 505 from the B. F. Goodrich Co. The product, a 20 (S/MMA) 80 EPR polyblend, was then blended at levels of 5.8 and 19.4 phr with the PVC masterbatch formulation of Example 5. The property data are given in Table V.

EXAMPLE 25

A graft polyblend was prepared by the method of Example 3, but 80 g. of polyisobutylene (PIB) obtained as Vistanex L140 from Enjay Chemical Co., were used as the rubbery substrate. The product, a 20 (S/MMA) 80 PIB polyblend, was then blended at 5.8 and 19.4 phr levels with the PVC masterbatch formulation of Example 5. The property data are given in Table V.

Table V

| Example No. | Modifier[1] Type | Parts | HDT[2] °C. | $\eta_a$[3] 200γ | $10^3$ | Melt[4] Flow |
|---|---|---|---|---|---|---|
| 5 | None | 0 | 69 | 0.35 | 0.0094 | 8.7 |
| 24 | 20 (S/MMA) 80 EPR | 5.8 | 76 | 0.20 | 0.062 | — |
| 24 | 20 (S/MMA) 80 EPR | 19.4 | 74 | — | — | 129 |
| 25 | 20 (S/MMA) 80 PIB | 5.8 | 76 | 0.19 | 0.046 | — |
| 25 | 20 (S/MMA) 80 PIB | 19.4 | 76 | — | — | Too Fast |

Notes:
[1]Modifiers from Examples 24 and 25 in blend compositions with PVC masterbatch formulation of Example 5.
[2]See note 2, Table I.
[3]See note 3, Table I.
[4]See note 3, Table II.

It will be apparent from these data that graft polyblends employing rubbery polymers and copolymers of mono-olefins as the rubbery saturated hydrocarbon polymer substrate are also effective as melt flow modifiers for PVC.

The instant invention will thus be seen to be graft polyblends prepared by polymerizing from 0 to 35 parts by weight vinyl aromatic monomer and from 3.7 to 50 parts by weight acrylic or methacrylic ester monomer in the presence of a rubbery saturated hydrocarbon polymer. These graft polyblends are modifiers for PVC, and when employed in amounts of from 3 to 25 parts polyblend per 100 parts of PVC, markedly improve the melt flow properties of the resin.

While the examples provided amply illustrate the practice of this invention, it will be apparent to one skilled in the art that further modifications and variations are possible and the examples therefore are provided by way of illustration and not for limitation of the scope of the invention, which is defined solely by the appended claims.

I claim:

1. A polyblend composition consisting of from 50 to 90% by weight of a rubbery substrate selected from the group consisting of hydrogenated homopolymers of 1,3-butadiene having greater than 30% 1,2-polymerized units and hydrogenated copolymers of 1,3-butadiene with up to 60% by weight styrene, from 50 to 3.7% by weight of an acrylate grafting monomer selected from the group consisting of methyl acrylate, ethyl acrylate, methyl methacrylate and mixtures thereof, and from 0 to 35% by weight of a vinyl aromatic grafting monomer selected from the group consisting of styrene, alpha methyl styrene, vinyl toluene and mixtures thereof, wherein said grafting monomers are graft polymerized in the presence of said rubbery substrate, and wherein said rubbery substrate contains no detectable ethylenic unsaturation.

2. The polyblend composition of claim 1 wherein the vinyl aromatic monomer is styrene and the acrylate monomer is methyl methacrylate.

3. The polyblend composition of claim 2 wherein the styrene and methyl methacrylate are present in substantially a 1:1 ratio by weight.